Oct. 15, 1946.  E. JACOBSON  2,409,285
COLOR CHART SYSTEM
Filed July 9, 1943  2 Sheets-Sheet 1
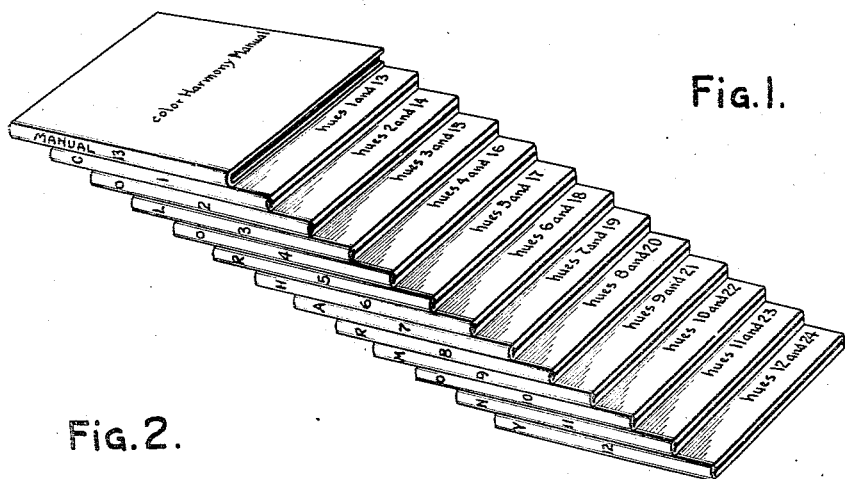
Fig.1.
Fig.2.
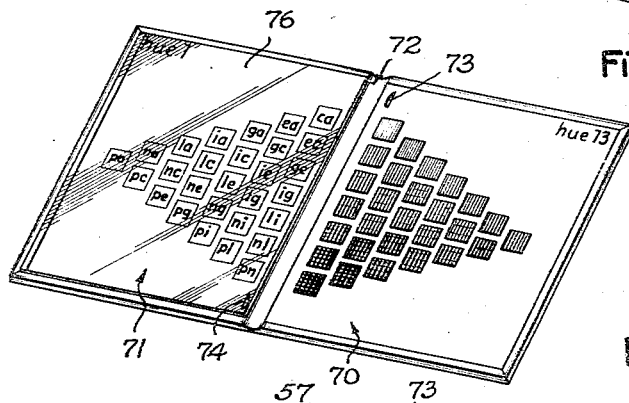
Fig.6. Fig.7.
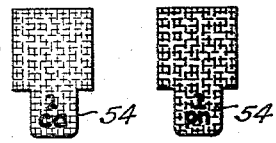
Fig.8. Fig.9.
 
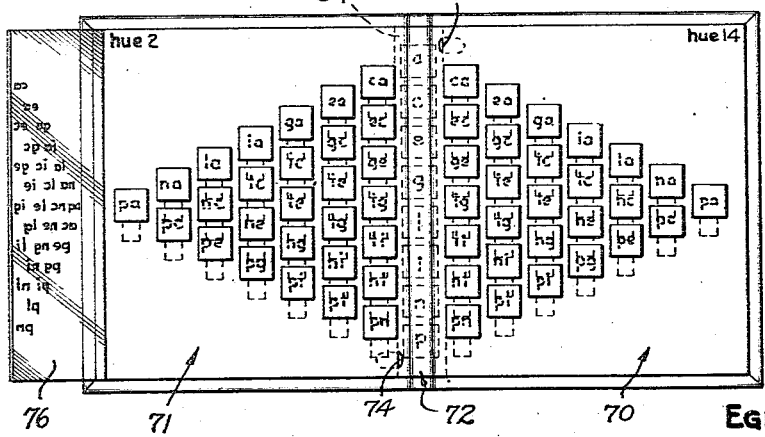
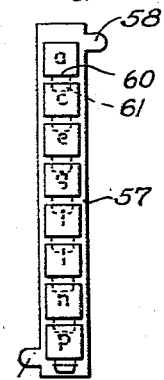
Fig.10.
Fig.3.
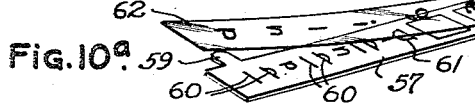
Fig.10ª
Inventor
EGBERT JACOBSON,
By C. H. Seeley
Attorney Oct. 15, 1946.  E. JACOBSON  2,409,285
COLOR CHART SYSTEM
Filed July 9, 1943  2 Sheets-Sheet 2
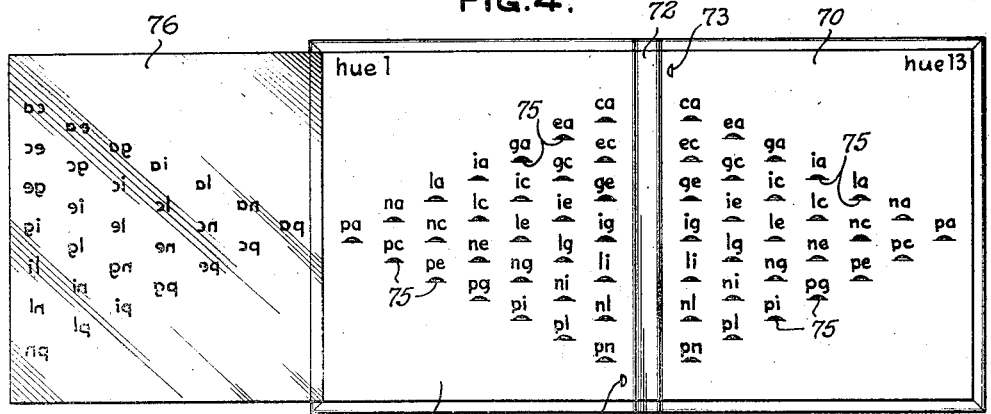
FIG. 4.
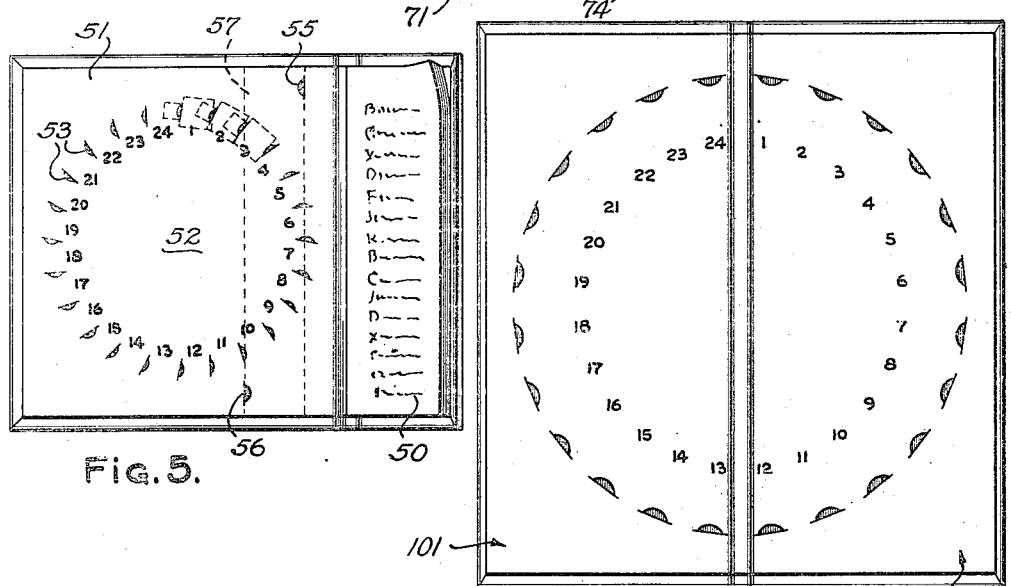
Fig. 5.
Fig. 11.
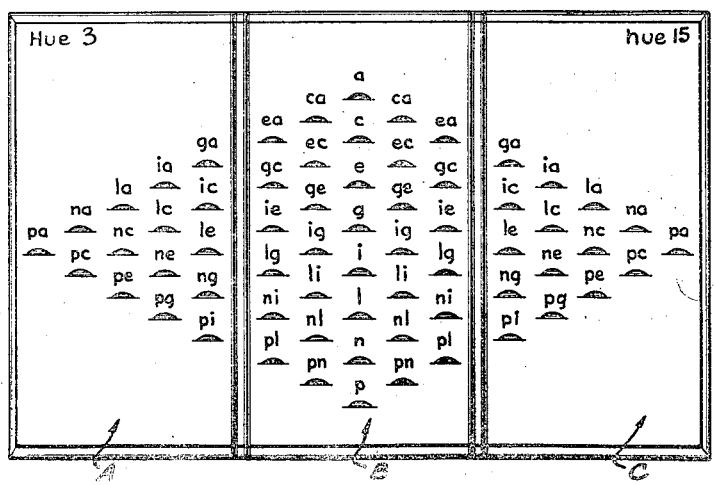
Fig. 12.
Inventor
EGBERT JACOBSON,
By C. H. Seeley,
Attorney Patented Oct. 15, 1946

2,409,285

UNITED STATES PATENT OFFICE 2,409,285

COLOR CHART SYSTEM

Egbert Jacobson, Chicago, Ill., assignor to Container Corporation of America, Chicago, Ill., a corporation of Delaware Application July 9, 1943, Serial No. 494,082

8 Claims. (Cl. 35—26)

The present invention relates to a color chart system preferably embodied in a series of folders each adapted to receive a plurality of removable color chips suitably identified so that information concerning the same may be readily recorded and conveyed from one person to another.

The invention includes among its objects the provision of a simple and economical system of devices for displaying classified color groupings or hues in such a manner as to show the interrelation of the color groups for the purpose of color study, and also to provide a convenient classification of surface colors which will enable comparisons to be made with colored articles, inks or coatings to determine the classification of such color on the color chart and to enable a user to make a record of such color and to transmit information concerning the same to a person possessing a similar chart at a distant location.

Another object of my invention is to provide classified groupings of color indicia in a set of folders bearing the color indicia necessary and desirable for representing all the colors in a substantially complete so-called Ostwald color solid. Still further objects are to provide means for enabling a user of the chart to remove and replace individual indicia elements and to provide for a maximum degree of usefulness of the color chart system without necessitating a duplication of any of the color indicia. Other objects will be apparent from the following description of my invention.

While my invention in its broad aspects is not so limited, my presently preferred embodiment thereof is based upon Ostwald's theory of color variations, which is completely described in "Colour Science, Parts One and Two" by Wilhelm Ostwald, translated by J. Scott Taylor and published by Windsor and Newton, London. According to this theory the relationship of all colors may be shown by considering them to be arranged in the form of a geometric solid herein called the Ostwald color solid.

Briefly stated the Ostwald color solid is in the shape of two similar cones placed together with their bases coinciding. Around the periphery or "equator" of this solid figure, the pure primary colors red, yellow, green and blue are located at intervals 90 degrees, with the other intermediate hues arranged between them and also on the equator. Black, white and the intermediate gray shades are located on the axis extending between the apices of the solid, black being at the apex of the lower cone and white at the apex of the upper cone. The surface of the upper cone includes all colors representing the gradations between the pure hues and white, and the surface of the lower cone includes those colors intermediate the various hues and black, while the interior of the solid includes those colors intermediate the various hues and the various shades of gray. It will be noted that in this theoretical solid figure vertical directions represent variations in light reflectance or brilliance, radial directions represent variations in color saturation, and circumferential directions represent variations in hue.

Since in the theoretical solid the colors vary continuously in all directions, it would not afford definite points of color reference. Dr. Ostwald believed that 680 colors, including 672 chromatic and 8 achromatic colors properly located in accordance with the theoretical solid, would serve for most practical purposes, and these are the colors used in the preferred embodiment of my invention hereinafter described.

In accordance with this embodiment, I provide a color chart system which I have termed a Color Harmony Manual, the system preferably comprising a series of folders, one of which may be conveniently termed the "reference volume or folder," and may contain printed matter descriptive of the system and its method of use, together with a circle work chart for displaying in circular arrangement a series of hues selected from the visible spectrum. The reference folder is likewise preferably equipped to receive an axis panel carrying a "gray scale" upon which removable chips bearing achromatic colors ranging from white, through gray, to black are adapted to be disposed. Each of the other folders, preferably twelve in number, which I may term the "hue chart folders," includes on opposite panels a pair of charts for the display of two color groups or hues. Preferably the opposite panels of a single folder are adapted to display variations of complementary hues. Each of the charts is adapted to include a series of detachable color chips, each chip bearing a designated hue number and also indicia indicating its relation to the gray scale and to the other colors of that hue. These hue chart folders, each including two displays of complementary hues, will, when taken together, present a large number of selected hues of the spectrum each with numerous variations. Each of the complementary hue chart folders is also equipped to receive the axis panel intermediate the two hue charts. The axis panel to carry the gray scale may be in the form of a rectangular strip provided with tongues adapted to fit in slots arranged in form to receive the same in the various hue chart folders and in the reference folder, which latter may also be designated as a "circle work chart folder."

The practical utility of my device consists in affording all artists, merchants and their customers, and educators the means of communicating with each other by predetermined signs or symbols their precise ideas of color.

The invention will be more readily understood by reference to the accompanying drawings, in which are set forth specific embodiments of the invention.

In the drawings—

Fig. 1 is a perspective view representing the reference folder and various hue chart folders preferably included in the color chart system;

Fig. 2 is a perspective view of one of the hue chart folders opened up to show triangular charts for two complementary hues, and showing a transparent panel covering one of the charts and bearing printed indicia thereon;

Fig. 3 is a view somewhat similar to Fig. 2 but applied to a different hue and showing the transparent panel opened up and likewise showing the axis panel carrying the gray scale in place between the complementary hue charts;

Fig. 4 is a view similar to Fig. 3 but with the color chips and axis panel removed;

Fig. 5 is a perspective view of the reference folder opened up to show the circle work chart and the printed text;

Figs. 6 and 7 are views showing a pair of removable chromatic color chips of a type intended to be used with the various color charts and having suitable identifying indicia showing their exact location in the system;

Figs. 8 and 9 are views showing two of the achromatic color chips adapted to be disposed on the axis panel;

Fig. 10 is a view showing the axis panel equipped with tabs permitting its insertion in any of the folders of the system;

Fig. 10a is a perspective view of the axis panel equipped with a transparent panel having suitable indicia thereon, and the color chips being removed from the scale;

Fig. 11 is a view showing a modified form of the work circle or chart wherein the two halves of the chart are included on separate panels;

Fig. 12 is a modification of the complementary hue chart wherein the chart is embodied in three panels and the gray scale is permanently included between the two sets of complementary hue charts.

Referring in detail to the drawings, Fig. 1 shows a set of thirteen folders which may collectively be considered as embodying the color chart system of the present invention and may, collectively or individually, be referred to as comprising the Color Harmony Manual. The set of folders includes complementary hue chart folders numbered consecutively 1 to 12, two of which folders are further illustrated in Figs. 2, 3 and 4, the other folders being similar except for the fact that different pairs of hues are displayed in them. The set also includes a reference folder or circle chart manual which is numbered 13 in the series and is shown in detail in Fig. 5. In this folder, however, the color chips which are intended to be used in the system are removed in order to show the construction of the slots which are adapted to receive the same. The reference folder shown in Fig. 5 preferably also includes a descriptive printed section 50 explaining the operation of the system. The reference folder likewise includes a panel 51 having centrally arranged thereon a circular work chart 52 comprising circumferentially arranged and equally spaced slots 53 numbered consecutively 1 to 24 inclusive, each of which is adapted to receive a chromatic color chip of the type shown in Figs. 6 and 7, bearing numbers corresponding to the numbers appearing adjacent the slots. The numbers represent twenty-four hues selected from the visible spectrum and include the primary colors yellow, red, blue and green, and intermediate hues. According to the preferred embodiment of the invention 1 is yellow, and the successive numbers reading clockwise indicate the other hues passing successively and in substantially equal steps from yellow to orange, thence to red, violet, blue, green and back to yellow.

According to the present chart diametrically opposite numbers, such as 1 and 13, 2 and 14, 3 and 15, etc., are complementary colors. Thus, numbers 1 and 13 represent yellow and blue, respectively. The color chips are preferably of the form shown in Figs. 6 and 7, and each is provided with a tab 54 adapted to be inserted in one of the circumferentially arranged slots 53 of the circle work chart. As previously pointed out the numeral on the tab indicates the hue and the letters on the tab indicate the proper position of that tab in its particular hue chart.

In addition to the color circle chart the reference folder is also provided with slots 55 and 56 adapted to receive tabs 58 and 59 carried by the axis panel shown in Fig. 10 so that the axis panel may be retained in the reference folder when not in use as a reference scale for the hue charts included in folders 1 to 12.

The axis panel 57 as shown comprises an elongated rectangular strip having a pair of laterally extending tabs 58 and 59 to permit insertion in slots in one of the hue chart folders or in the circle chart or reference folder. The axis panel is also provided with vertically arranged slots 60, herein shown as eight in number, adapted to receive tabs 61 of the achromatic or gray scale chips shown in Figs. 8 and 9. These range in value and in perceptually equal steps from white at the top to black at the bottom, with grays in between which are progressively darker from top to bottom. These shades are arbitrarily designated by the letters a, c, e, g, i, l, n and p to represent selected gradations on the achromatic scale. The location for the particular chip is preferably designated on the panel itself just above the slot for receiving the respective chip. These letters are indicated in dotted lines in Fig. 10, although it will be understood that when the chip is in place the designating letter may not show through. Preferably, also, the identifying letters are applied on the tabs of the chips so that each may be properly related to its particular location on the axis panel. The axis panel may also be provided with a hinged cover sheet 62 preferably of transparent material (Fig. 10a), but bearing designating letters corresponding to those on the axis scale and on the chips, so that these letters may be read on the scale when the chips are in place.

The gray scale or axis panel with the eight removable chips applied thereto is adapted to be employed in connection with each of the hue chart folders 1 to 12, inclusive, which folders are provided with slots to receive the tabs 58 and 59 thereon. Thus a single axis panel carrying the gray scale may be used for each of the folders 1 to 12, and when not in use therewith may be stored in the reference manual 13.

The hue chart folders are preferably of the type shown in Figs. 2, 3 and 4, and each includes a pair of panels 70 and 71 hingedly connected at the fold line 72. The two panels may be folded together so as to protect the color charts, and when so folded a convenient volume is provided which may be readily stored for reference purposes.

Opposite panels of the hue chart folders are adapted to display complementary hues, which are indicated at the top of each panel. Thus, in Figs. 2 and 4 complementary hues 1 and 13 are indicated, while in Fig. 3 complementary hues 2 and 14 are indicated. The other ten folders will include the other twenty hues. For the purpose of the present description hue 1 will be considered as yellow and hue 13 as blue. Each of the hue chart folders likewise preferably includes a pair of vertical slots 73, 74 adjacent the fold line 72, one slot 73 being on panel 70 and located at the top, and the other slot being on the opposite panel 71 and located near the bottom. These slots are adapted to receive the tabs 58 and 59 of the axis panel, which is shown in position in Fig. 3, but not in Figs. 4 and 5.

On opposite faces of the hue chart folders are arranged similar charts for the two hues to be displayed. These are in the form of two oppositely directed triangles each including a series of slots 75 (Fig. 4) designated by a pair of letters, selected from the letters used to designate the colors in the gray scale. The bases of the two triangles representing the complementary hues approach one another adjacent the fold line 72 of the folder near which the gray scale is intended to be placed, and these triangles taper from their bases toward apices near the margins of the panels. When considered together the two triangular charts making up the complementary hue charts, and, together with the gray scale, they may be considered as forming a diamond-shaped chart with the gray scale at the center and the complementary hue charts at each side.

The various slots 75 which, together, make up the triangular charts referred to above, are adapted to receive tabs 54 of color chips such as shown in Figs. 6 and 7, the tab of each color chip, as previously described, bearing an identifying number to designate its hue and a combination of letters indicating its position in the particular hue chart.

Since the tabs 54 of the color chips, when inserted in the slots, cover the identifying data on the panels, and since the tabs on the chips are no longer visible when inserted in their respective slots, I preferably provide at least one transparent panel 76 hinged as herein shown to the outer edge of one of the panels, as 71, which transparent panel carries indicia corresponding to the indicia adjacent the chip slots. When the transparent panel is folded over the chart as illustrated at the left of Fig. 2, the designating letters upon the transparent strip overlie the corresponding color chips, and enable identification of the same. When the transparent strip is folded back as indicated in Figs. 3 and 4 the surfaces of the chips show as clear colors without any obstructing marks thereon. Two such transparent panels with indicia thereon may be employed if desired, one for each of the two complementary hues, but this is not necessary since the arrangement of the chips on opposite faces of the folder is the same and the identification of color chips on the panel 70 can be readily determined from a comparison with the markings on panel 76, as will be apparent from Fig. 2.

In arranging the chips on the chart the purest color is arranged at the apex of the triangle. Thus in Fig. 2 the color at the extreme left represents substantially pure yellow and the color at the extreme right represents substantially pure blue, not mixed with white, black or gray. These substantially pure colors are designated by letters $pa$. The first letter of a letter combination indicates a uniformity of white value and the second letter indicates a uniformity of black value. Thus, tabs having $p$ as the first letter have a zero amount, or absence, of white value and tabs having $a$ as the second letter have a zero amount of black value. Tabs having $n$ as the first letter likewise have a uniformity of white value which however is, as herein disclosed, a greater white value than that of tabs having $p$ as the first letter. Similarly tabs having $l$, $i$, $g$, $e$, and $c$ as the first letter have increasing white values in that order, and tabs having $c$, $e$, $g$, $i$, $l$ and $n$ as the second letter have increasing black values in that order. The colors on the respective chips vary progressively in rows considered either vertically or diagonally. This will be apparent from the representation shown at the right hand panel in Fig. 2, in which variations in blue hue are adapted to be displayed. Similar variations for the other twenty-three hues are covered by the various charts in the series.

Thus it will be apparent that numerous comparisons of colors, both in the chromatic and achromatic series, are facilitated in accordance with my invention. The gray scale when used alone permits comparisons within the achromatic series. When used in connection with the displays of complementary hues in the successive folders 1 to 12 the gray scale forms a standard of comparison for the shade variations in the chromatic colors which are displayed on opposite sides of the gray scale.

It is also possible to arrange chips of various hues in circular arrangement upon the circle chart in Fig. 5. Thus, if substantially pure colors are to be displayed in the circle chart the twenty-four chips bearing the letters $pa$ will be selected and arranged in the circle in numerical order according to the number appearing on the tab. Likewise, other chips of corresponding gray value may be compared on the circle chart, as, for example, light colored chips 1 to 24 carrying identifying symbols $ca$.

The chips may also be compared one with another in the various hue charts considered in the diagonal or in the vertical rows.

Thus the diagonal row sloping from the clear color $pa$ at the apex upwardly to the white chip $a$ carried by the axis panel may be designated the "light clear series" and these chips will be found to be progressively lighter from the chip $pa$ to the chip $a$.

The diagonal series extending downwardly from chip $pa$ to the black chip $p$ carried by the axis panel may be designated the "dark clear series" and the shades are progressively darker by reason of the inclusion of progressively more and more black with the basic hue.

Other diagonal rows in the series may also be compared, and likewise the chips arranged in vertical rows. Thus the system provides for standards of comparison between various shades and tints of a single hue.

The color chips which are used in the present system are preferably prepared by applying a pigmented film of appropriate color to a base of clear transparent cellulose acetate. This provides a color standard with a dull surface on the side of the coating and a glossy surface on the other side, which presents a decided advantage, particularly in comparing flat color with inks or wet paint samples. Pigments having the maximum permanence are preferably used in a vehicle composed of cellulose acetate in order to keep color change at a minimum.

While the specific embodiment of the system as set forth in Figs. 1 to 10, inclusive, is preferred, numerous modifications and variations may be resorted to without departing from the spirit of the invention. Thus in Fig. 11 a modification of the circle work chart shown in Fig. 5 is indicated. In Fig. 11 the folder is shown longer but of the same width as the folder shown in Fig. 5 and half of the circle, including hues 1 to 12, is included on one panel 100 of the folder, while the other half, comprising hues designated 13 to 24 inclusive, is provided on the other panel 101 of the volume, the two panels being hingedly connected so as to permit closure of the folder. This arrangement permits the use of a larger circle for the same width of folder than that indicated in Fig. 5. Similarly, in Fig. 12 the variation in the complementary hue chart system is set forth. In this modification three hinged panels, A, B and C, are included. The panel A includes a portion of one of the complementary colors while the panel C includes a portion of the other complementary hue; the intermediate panel B includes the gray scale represented by letters $a, c, e, g, i, l, n$ and $p$, and the remaining portions of the charts relating to the hues is represented on panels A and C, respectively. This form of chart presents an advantage over the form previously shown in that it is not necessary to remove the gray scale, since the gray scale is permanently incorporated as a part of the chart.

Numerous other modifications and variations of the invention will be apparent to those skilled in the art and it is therefore not intended to limit the invention thereto, but only by the scope of the following claims.

I claim:

1. In a hinged, two-panel folder having a group of color indicia disposed thereon constituting two complementary color sub-groups of an axial cross-section extending to opposite sides of an Ostwald color solid, one sub-group of indicia being disposed on each panel of the folder, a separate panel carrying a third sub-group of indicia varying from white to black and constituting the axis of the Ostwald color solid, and means for separably connecting the last mentioned panel along the hinge of the folder, whereby positioning of the axis sub-group completes the cross-section of the Ostwald color solid.

2. In a plurality of hinged, two-panel folders, the two panels of each folder each bearing one sub-group of indicia, constituting two complementary color sub-groups representing a plurality of different axial cross sections extending to opposite sides of an Ostwald color solid, one sub-group of indicia being disposed on each panel of each folder, a separate panel carrying a sub-group of indicia varying from white to black and constituting the axis of the Ostwald color solid, and means on the folders for separably connecting the last mentioned panel selectively along the hinge of the folders, whereby the axis sub-group will complete a cross section of the Ostwald color solid on the folder to which it is secured.

3. In a hinged, two-panel folder having a group of color indicia disposed thereon constituting two complementary color sub-groups of an axial cross-section extending to opposite sides of an Ostwald color solid, one sub-group of indicia being disposed on each panel of the folder, a separate panel carrying a third sub-group of indicia varying from white to black and constituting the axis of the Ostwald color solid, and means for separably connecting the last mentioned panel along the hinge of the folder, whereby positioning of the axis sub-group completes the cross-section of the Ostwald color solid, said connecting means comprising slits formed in the folders, one slit being formed in one folder panel adjacent one end of the hinge line and the other slit being formed on the other folder panel adjacent the other end of the hinge line.

4. In a hinged two-panel folder having a group of color indicia thereon constituting two complementary sub-groups of at least a portion of an axial cross section of an Ostwald color solid, the indicia in each sub-group on each panel being symmetrically located relative to the hinge of the folder, a transparent separating panel hinged along one edge of one of the folder panels, said separating panel bearing symbols thereon arranged to conform to the positions of and to designate the underlying color indicia on the folder panel.

5. In a hinged, two-panel folder having a group of color indicia disposed thereon constituting two complementary color sub-groups, one sub-group of indicia being systemtically disposed on each folder panel with the indicia constituting the pure hue disposed distant from the hinge of the folder and the indicia constituting the colors representing admixtures of the smallest quantity of said hue with the greatest quantity of a neutral color selected from the class consisting of black, white and mixtures thereof disposed adjacent said hinge, a separate panel carrying a third sub-group of indicia constituting neutral colors varying from white to black, and means for separably connecting said last-mentioned panel along said hinge, whereby positioning of said third sub-group completes the color gradations exhibited by the indicia disposed on both of said folder panels.

6. A device adapted for the systematic display of colors comprising a pair of hingedly joined display panels, each of said panels having a plurality of color specimens systematically disposed thereon in an arrangement which is logically complete except for a series of colors to be located along the hinge between said panels, a strip having a plurality of color specimens disposed thereon constituting said series of colors, and means for detachably securing said strip in a position overlying said hinge, whereby positioning of said strip completes the logical sequence of the color specimens on both of said panels.

7. A device according to claim 6 wherein said securing means includes a slit in each of said panels and tabs on said strip adapted to enter said slits when said strip overlies said hinge.

8. A device adapted for the systematic display of colors comprising a pair of hingedly joined display panels, each of said panels having a plurality of color specimens systematically disposed thereon in an arrangement which is symmetrical with respect to the hinge between said panels, and a transparent separating panel hinged along one edge of one of said display panels, said separating panel bearing symbols thereon arranged to conform to the positions of and to designate the underlying color specimens on one of said display panels, whereby the proper designation of the color specimens on the other of said display panels may be determined by reason of the symmetry of the arrangement thereof.

EGBERT JACOBSON.